(12) United States Patent
Kapoor et al.

(10) Patent No.: US 8,037,073 B1
(45) Date of Patent: Oct. 11, 2011

(54) DETECTION OF BOUNCE PAD SITES

(75) Inventors: Rupesh Kapoor, Mountain View, CA (US); David Michael Proudfoot, Mountain View, CA (US); Joachim Kupke, San Jose, CA (US)

(73) Assignee: Google Inc., Mountain View, CA (US)

( * ) Notice: Subject to any disclaimer, the term of this patent is extended or adjusted under 35 U.S.C. 154(b) by 465 days.

(21) Appl. No.: 12/345,203

(22) Filed: Dec. 29, 2008

Related U.S. Application Data

(60) Provisional application No. 61/018,132, filed on Dec. 31, 2007.

(51) Int. Cl.
*G06F 17/30* (2006.01)

(52) U.S. Cl. .......... 707/740; 707/706; 707/736; 706/12; 706/14; 706/15

(58) Field of Classification Search .................. None
See application file for complete search history.

(56) References Cited

U.S. PATENT DOCUMENTS

| | | | |
|---|---|---|---|
| 6,978,419 B1 * | 12/2005 | Kantrowitz | 715/209 |
| 7,617,285 B1 * | 11/2009 | Hartmann | 709/206 |
| 7,627,613 B1 * | 12/2009 | Dulitz et al. | 1/1 |
| 7,698,317 B2 * | 4/2010 | Sasturkar et al. | 707/609 |
| 2002/0038350 A1 * | 3/2002 | Lambert et al. | 709/217 |
| 2003/0225763 A1 * | 12/2003 | Guilak et al. | 707/7 |
| 2004/0210575 A1 * | 10/2004 | Bean et al. | 707/6 |
| 2006/0218168 A1 * | 9/2006 | Na et al. | 707/101 |

OTHER PUBLICATIONS http//en.wikipedia.org/wiki/URL_redirection; "URL redirection", 8 pages, Nov. 9, 2007.

* cited by examiner

*Primary Examiner* — Apu Mofiz
*Assistant Examiner* — Hung Le
(74) *Attorney, Agent, or Firm* — Harrity & Harrity, LLP

(57) ABSTRACT

A system may identify a set of related documents, identify one or more documents in the set of related documents that are sources of redirects, and identify organizations that are targets of the redirects. The system may also determine a redirect score based on the number of the identified documents that are sources of the redirects, determine a spam score based on a number of the organizations that are targets of the redirects, determine whether to classify the set of related documents as a bounce pad based on the redirect score and the spam score, and storing information associated with the result of the determination of whether to classify the set of related documents as a bounce pad.

22 Claims, 13 Drawing Sheets

WEB SITE A.COM :  40% OF DOCUMENTS ARE NOT REDIRECTS
                  60% OF DOCUMENTS ARE REDIRECTS

REDIRECT SCORE = 60

HEAD = 24%

TAIL = 76%

$$\text{SPAM SCORE} = \frac{\text{TAIL}}{\text{HEAD}} = \frac{76}{24}$$

DETECTION OF BOUNCE PAD SITES

RELATED APPLICATIONS

This application claims priority under 35 U.S.C. §119(e) based on U.S. Provisional Application Ser. No. 61/018,132, filed Dec. 31, 2007, the disclosure of which is incorporated herein by reference.

BACKGROUND

The World Wide Web ("web") contains a vast amount of information that is ever-changing. Existing web-based information retrieval systems use web crawlers to identify information on the web. A web crawler is a program that exploits the link-based structure of the web to browse the web in a methodical, automated manner.

A web crawler may start with addresses (e.g., Uniform Resource Locators (URLs)) of links to visit. For each address on the list, the web crawler may visit the document associated with the address. The web crawler may identify outgoing links within the visited document and add addresses associated with these links to the list of addresses.

An indexer creates an index of the documents crawled by the web crawler. A problem that indexers face is how to handle duplicate content on the web. For example, the same document may appear duplicated or substantially duplicated in different forms or at different places on the web. Also, spammers oftentimes copy document content and pass this content off as their own.

It is undesirable for the indexer to index all of the duplicate documents. For example, indexing duplicate documents wastes space in the index. Also, indexing duplicate documents, and thus, making the duplicate documents available for serving as search results leads to an undesirable experience for the user. A user does not want to be presented with multiple documents containing the same, or substantially the same, content.

Given a set of duplicate documents, an indexer may select one of these documents to index. Determining which of the duplicate documents to index is not an easy task because it is sometimes difficult to determine which of two duplicate documents is legitimate. It would be undesirable for the indexer to select a document belonging to a spammer.

SUMMARY

According to one aspect, a method may include identifying a set of related documents; identifying one or more documents in the set of related documents that are sources of redirects; identifying organizations that are targets of the redirects; determining a redirect score based on a number of the identified documents that are sources of the redirects; determining a spam score based on a number of the organizations that are targets of the redirects; determining whether to classify the set of related documents as a bounce pad based on the redirect score and the spam score; and storing information associated with a result of the determination of whether to classify the set of related documents as a bounce pad.

According to another aspect, a system may include means for identifying sets of related documents; means for selectively classifying the sets of related documents as bounce pads based on redirects associated with documents in the sets of related documents; means for compiling a list of bounce pads based on one or more of the sets of related documents that are classified as bounce pads; means for identifying a cluster of duplicate documents; means for determining whether a particular document in the cluster of duplicate documents corresponds to a bounce pad in the list of bounce pads; means for selecting one of the documents in the cluster of duplicate documents as representative of the cluster without considering the particular document when the particular document corresponds to a bounce pad in the list of bounce pads; and means for indexing the selected document.

According to yet another aspect, a system may include a memory and a processor. The memory may store a list of bounce pads. The processor may connect to the memory and may identify a set of related documents, identify documents in the set of related documents that are sources of redirects, identify organizations that are targets of the redirects, determine a redirect score based on a number of the identified documents that are sources of the redirects, determine a spam score based on a number of the organizations that are targets of the redirects, selectively classify the set of related documents as a bounce pad based on the redirect score and the spam score, and add information associated with the set of related documents to the list of bounce pads when the set of related documents is classified as a bounce pad.

According to a further aspect, a method may include identifying a cluster of duplicate documents; determining a measure of quality associated with each document in the cluster of duplicate documents; ranking the documents in the cluster of duplicate documents based on the measure of quality associated with each of the documents; determining that a particular document in the cluster of duplicate documents corresponds to a bounce pad in a list of bounce pads; selecting one of the documents in the cluster of duplicate documents as representative of the cluster without considering the particular document; and indexing the selected document.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
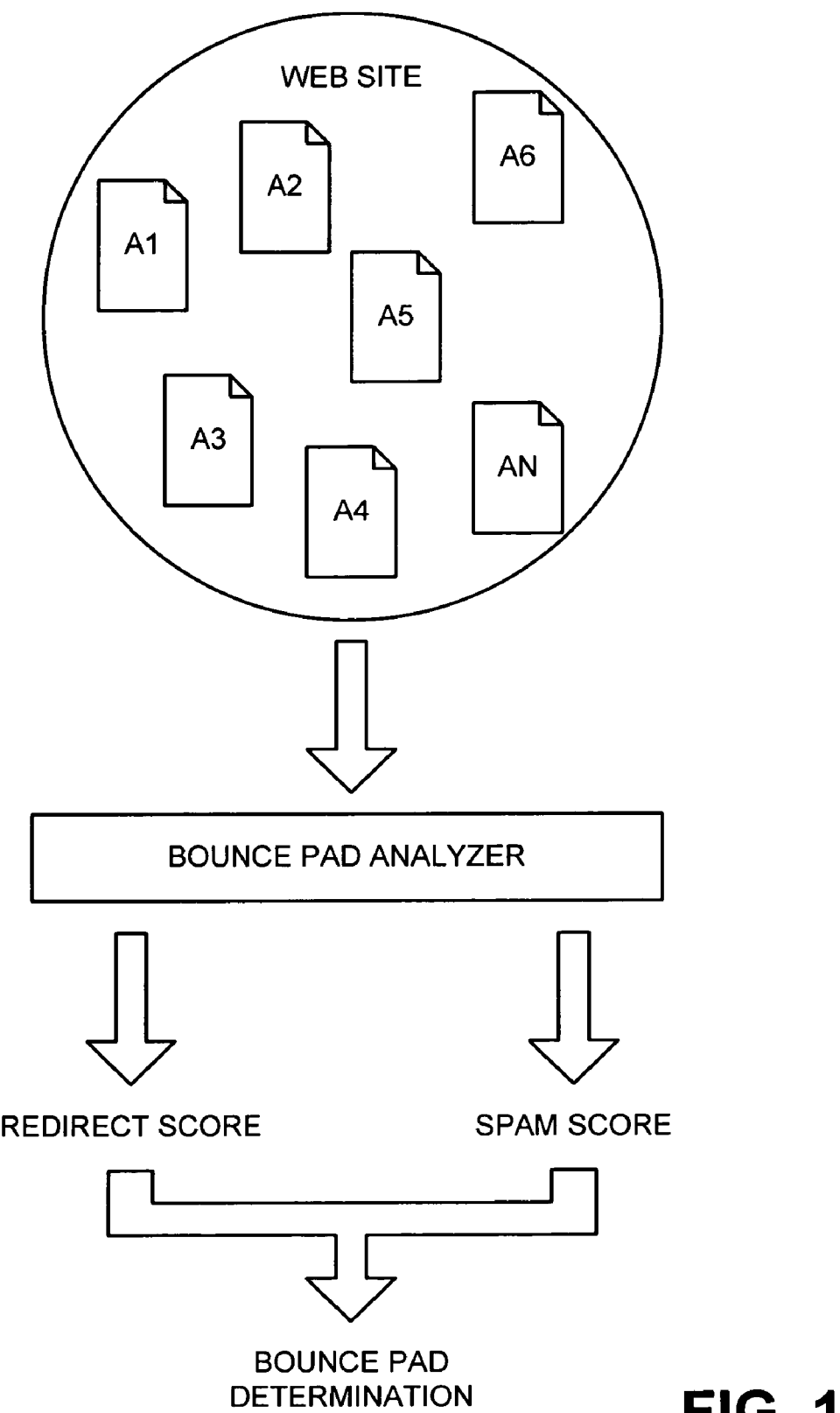
FIG. 1 is a diagram of an overview of an exemplary implementation described herein.

The following detailed description refers to the accompanying drawings. The same reference numbers in different drawings may identify the same or similar elements. Also, the following detailed description does not limit the invention.

Overview

In the description to follow, reference will be made to "documents" and "web sites." A "document," as the term is used herein, is to be broadly interpreted to include any machine-readable and machine-storable work product. In the context of the Internet, a common document is a web page. Web pages often include textual information and may include embedded information (such as meta information, images, hyperlinks, etc.) and/or embedded instructions (such as Javascript, etc.). A "web site," as used herein, is to be broadly interpreted to include a collection of related documents, such as documents associated with a same host, domain, or organization. For example, the collection of related documents might include all or a subset of the documents associated with a traditional web site, directory, or sub-directory, or some other set of documents that are related to each other (e.g., on the same host or associated with the same domain or organization).

In the context of indexing, the presence of duplicate (including substantially duplicate) documents may pose problems by wasting resources (e.g., computer, storage, and/or network resources) and degrading a user's search experience (e.g., by presenting multiple documents with essentially the same content). One technique described herein may select one duplicate document, as representative of a cluster of duplicate documents, to index. This "representative" document can then be served with search results.

Implementations described herein may identify bounce pads and remove the bounce pads from being selected to represent a cluster of duplicate documents. A "bounce pad," as used herein, may include a document or a collection of documents associated with a web site whose main purpose is to redirect to documents associated with other organizations (e.g., other web site owners or hosts).

Redirection is a technique for making a document available under more than one address (e.g., URL). Generally, a redirect causes a web browser to change from a source address to a target address. There are many types of redirects. For example, there are manual redirects, status code redirects, meta refresh redirects, frame redirects, and Javascript redirects. Full screen pop-ups may also be considered a form of redirects.

A manual redirect is a simple form of redirect where a document explicitly requests that a visitor follow a link to another document. A status code redirect is a form of redirect in which a response sent from a server with a HyperText Transfer Protocol (HTTP) status code that takes the form of 3xx, where "x" refers to an integer, and identifies a target address. For example, the HTTP status code 301 refers to a permanent redirect (e.g., the document has permanently moved to another address) and the HTTP status code 302 refers to a temporary redirect (e.g., the document has temporarily moved to another address).

A meta refresh redirect is a form of redirect in which a document includes a HyperText Markup Language (HTML) <meta>tag that causes a web browser to replace a source document with a target document after a delay specified in the meta tag. The meta refresh redirect may also be implemented using an HTTP refresh header. A frame redirect is a form of redirect in which a source document includes an HTML frame that contains a target document. A Javascript redirect is a form of redirect in which Javascript within a source document causes a web browser to redirect to a target document when the Javascript is executed by the web browser. A full screen pop-up is a form of redirect in which a source document causes a full screen pop-up of a target document to be presented.

Sometimes redirects are used for legitimate reasons and sometimes redirects are used for malicious reasons. An example of a legitimate reason to use redirects is when an organization wants to assist its visitors in finding a correct document when the visitors enter an incorrect address for the document. For example, organizations often register misspellings of domain names (e.g., "gooogle.com" or "googel.com") and redirect them to the correct domain name (e.g., "google.com"). Another example of a legitimate reason to use redirects is when an organization is moving its web site from one domain to another. In this case, the organization may cause the old web site addresses to redirect to the new web site addresses. An example of a malicious reason to use redirects is to fool a search engine into serving a spammer's page. For example, the main purpose of a bounce pad is to redirect to documents associated with other organizations. Another example of a malicious reason to use redirects is to confuse visitors as to which web site they are visiting in an attempt to get them to reveal private information as part of a phishing attack.

FIG. 1 is a diagram of an overview of an exemplary implementation described herein. As shown in FIG. 1, a bounce pad analyzer may analyze a set of documents associated with a web site. The bounce pad analyzer may compute two scores based on its analysis: a redirect score and a spam score. The redirect score may be based on the number of the web site documents that redirect to other documents. The spam score may be based on the number of other organizations that are the targets of the redirects. The redirect score and spam score may be used to determine whether to classify the web site as a bounce pad.

Exemplary Network Configuration

Figure 2:
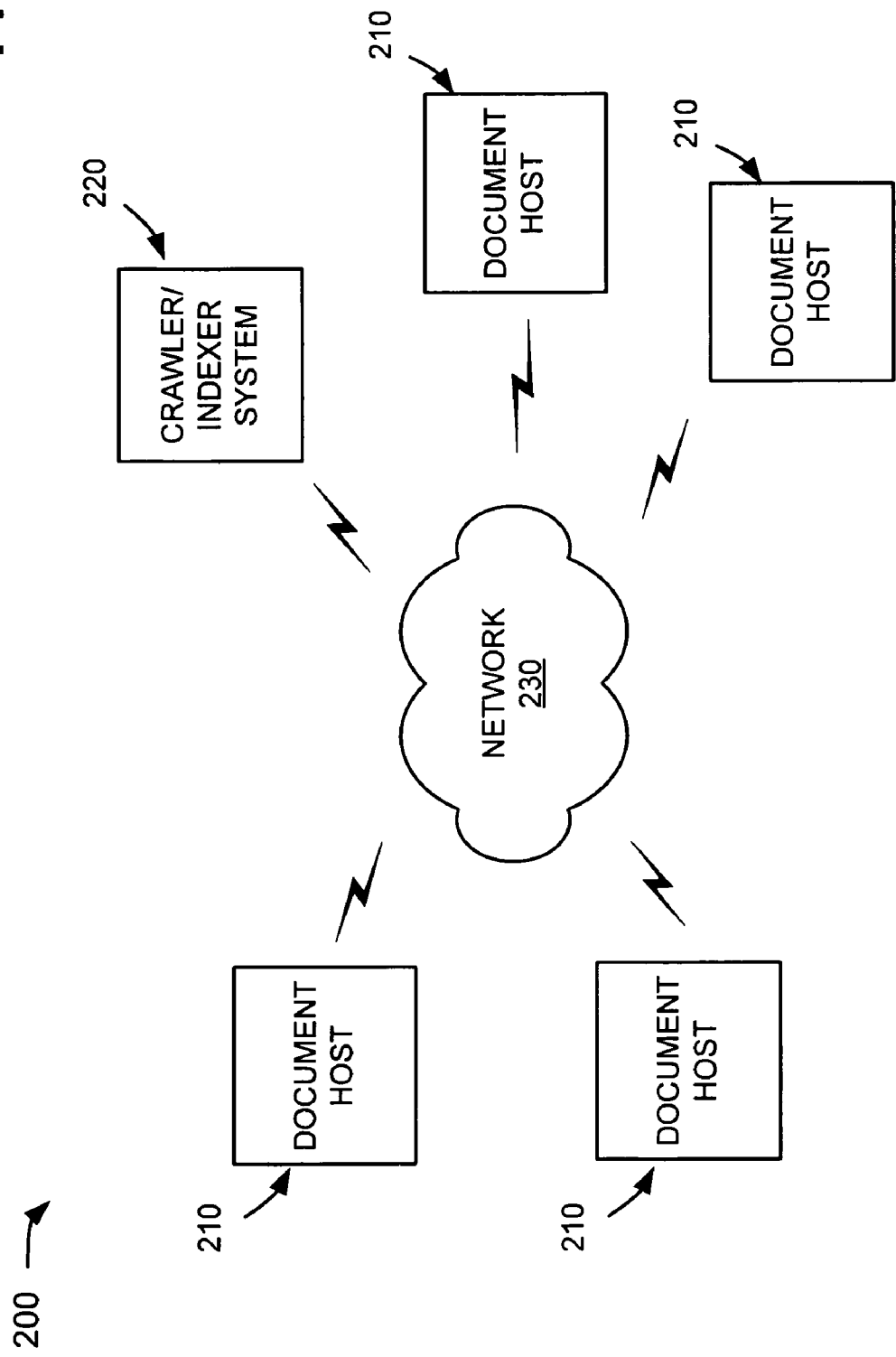
FIG. 2 is a diagram of an exemplary network in which systems and methods described herein may be implemented.

FIG. 2 is a diagram of an exemplary network 200 in which systems and methods described herein may be implemented. As illustrated, network 200 may include multiple document hosts 210 connected to a crawler/indexer system 220 via a network 230. Four document hosts 210 and a single crawler/indexer system 220 have been illustrated as connected to network 230 for simplicity. In practice, there may be more, fewer, or a different arrangement of document hosts 210 and/or crawler/indexer systems 220.

Document hosts 210 may include entities that store and/or manage documents. An entity may be defined as a device, such as a stationary or portable computer, a personal digital assistant (PDA), a lap top, a telephone device, or another type of computation or communication device, a thread or process running on one of these devices, and/or an object executable by one of these devices.

Crawler/indexer system 220 may include an entity that crawls, processes, indexes, and/or maintains documents. For example, crawler/indexer system 220 may crawl a corpus of documents (e.g., web documents), index the documents, and/or store information associated with the documents in a repository of documents. While crawler/indexer system 220 is shown as a single entity, it may be possible for crawler/indexer system 220 to be implemented as two or more separate (and possibly distributed) entities.

Network 230 may include a local area network (LAN), a wide area network (WAN), a telephone network, such as the Public Switched Telephone Network (PSTN) or a cellular network, an intranet, the Internet, or a combination of networks. Document hosts 210 and crawler/indexer system 220 may connect to network 230 via wired and/or wireless connections. The connections may either be direct or indirect connections.

Exemplary Crawler/Indexer System Architecture

Figure 3:
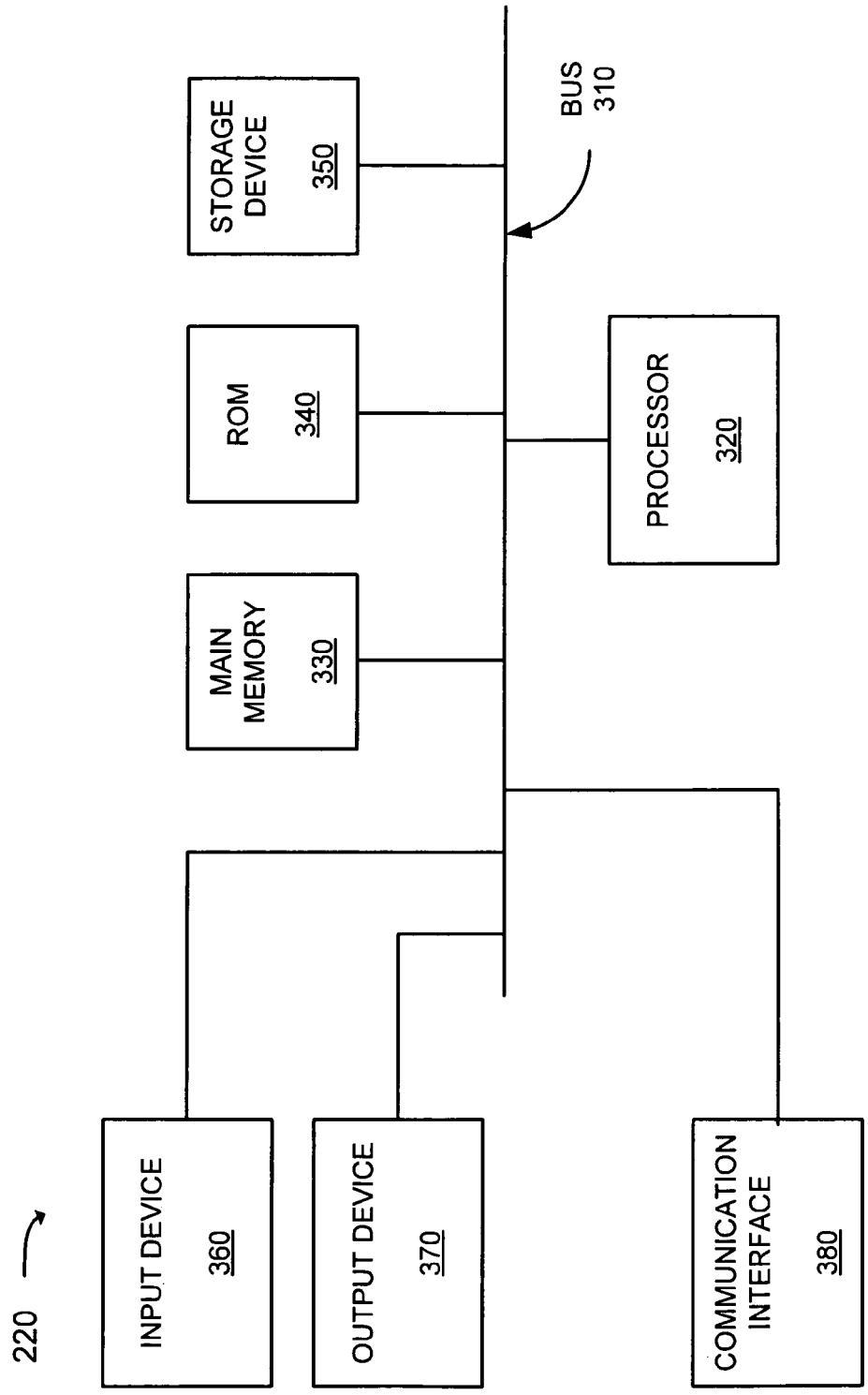
FIG. 3 is a diagram of exemplary components of the crawler/indexer system of FIG. 2.

FIG. 3 is a diagram of exemplary components of crawler/indexer system 220. As illustrated, crawler/indexer system 220 may include a bus 310, a processor 320, a main memory 330, a read only memory (ROM) 340, a storage device 350, an input device 360, an output device 370, and a communication interface 380. Bus 310 may include a path that permits communication among the components of crawler/indexer system 220.

Processor 320 may include a processor, a microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a component that permits an operator to input information to crawler/indexer system 220, such as a keyboard, a mouse, a pen, voice recognition and/or biometric mechanisms, etc. Output device 370 may include a component that outputs information to the operator, including a display, a printer, a speaker, etc. Communication interface 380 may include any transceiver-like mechanism that enables crawler/indexer system 220 to communicate with other devices and/or systems. For example, communication interface 380 may include components for communicating with another device or system via a network, such as network 230.

Crawler/indexer system 220 may perform certain operations, as will be described in detail below. Crawler/indexer system 220 may perform these operations in response to processor 320 executing software instructions contained in a computer-readable medium, such as memory 330. A computer-readable medium may be defined as a physical or logical memory device.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Crawler/Indexer System Functional Components

Figure 4:
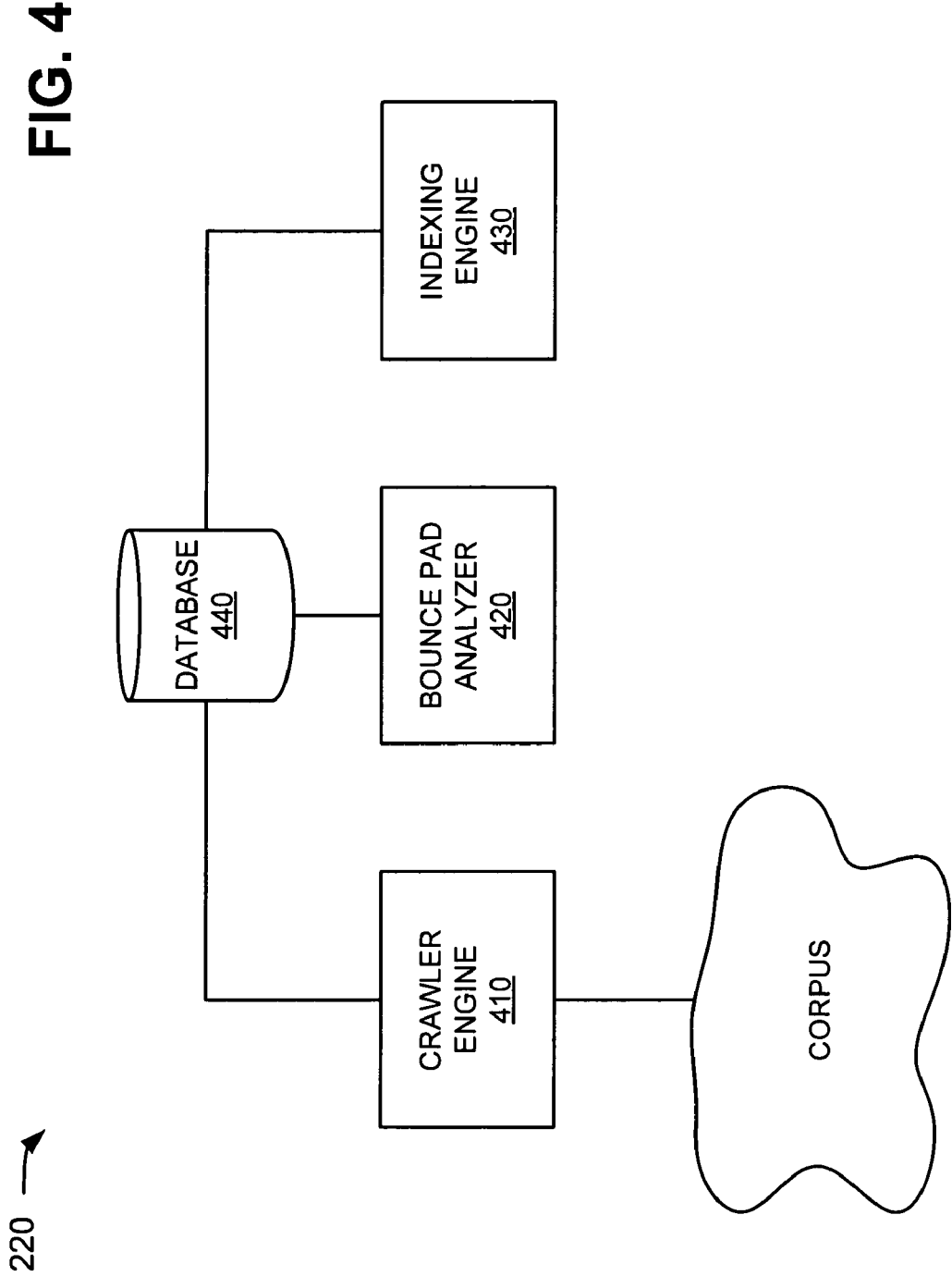
FIG. 4 is a diagram of exemplary functional components of the crawler/indexer system of FIG. 2.

FIG. 4 is a diagram of exemplary functional components of crawler/indexer system 220. As illustrated, crawler/indexer system 220 may include a crawler engine 410, a bounce pad analyzer 420, and an indexing engine 430 connected to a database 440. In one implementation, crawler engine 410, bounce pad analyzer 420, and/or indexing engine 430 may be implemented by software and/or hardware within crawler/indexer system 220. In another implementation, crawler engine 410, bounce pad analyzer 420, and/or indexing engine 430 may be implemented by software and/or hardware within another device or a group of devices separate from or including crawler/indexer system 220.

Crawler engine 410 may operate from a list of addresses to fetch the corresponding documents from a corpus of documents (e.g., the web). Crawler engine 410 may extract the addresses (e.g., URLs) associated with the outgoing links in a document and add the addresses to the list of addresses to be crawled. Crawler engine 410 may also store information associated with the document, such as all or part of the document, in database 440.

Bounce pad analyzer 420 may analyze documents associated with a web site to determine whether to classify the web site as a bounce pad. Generally, bounce pad analyzer 420 may classify a web site as a bounce pad based on a number of documents of the web site that contain redirects and/or the number of organizations that are targets of the redirects. In one implementation, bounce pad analyzer 420 may compile a list of web sites that have been classified as bounce pads.

Indexing engine 430 may operate upon documents crawled by crawler engine 410. For example, indexing engine 430 may create an index of the documents and store the index in database 440. Indexing engine 430 may operate upon a cluster of duplicate documents to select one of these documents as representative of the cluster. If one of the documents has been identified as a bounce pad by bounce pad analyzer 420, indexing engine 430 may remove this bounce pad document from selection as the representative of the cluster. As a result, indexing engine 430 may not index a bounce pad document and, thus, may ensure that the bounce pad document cannot be served as a search result.

Database 440 may be embodied within a single memory device or within multiple (possibly distributed) memory devices. Database 440 may store the list of addresses used by crawler engine 410, information associated with documents crawled by crawler engine 410, a list of bounce pads compiled by bounce pad analyzer 420, and/or the index generated by indexing engine 430.

Exemplary Crawler Engine Functional Components

Figure 5:
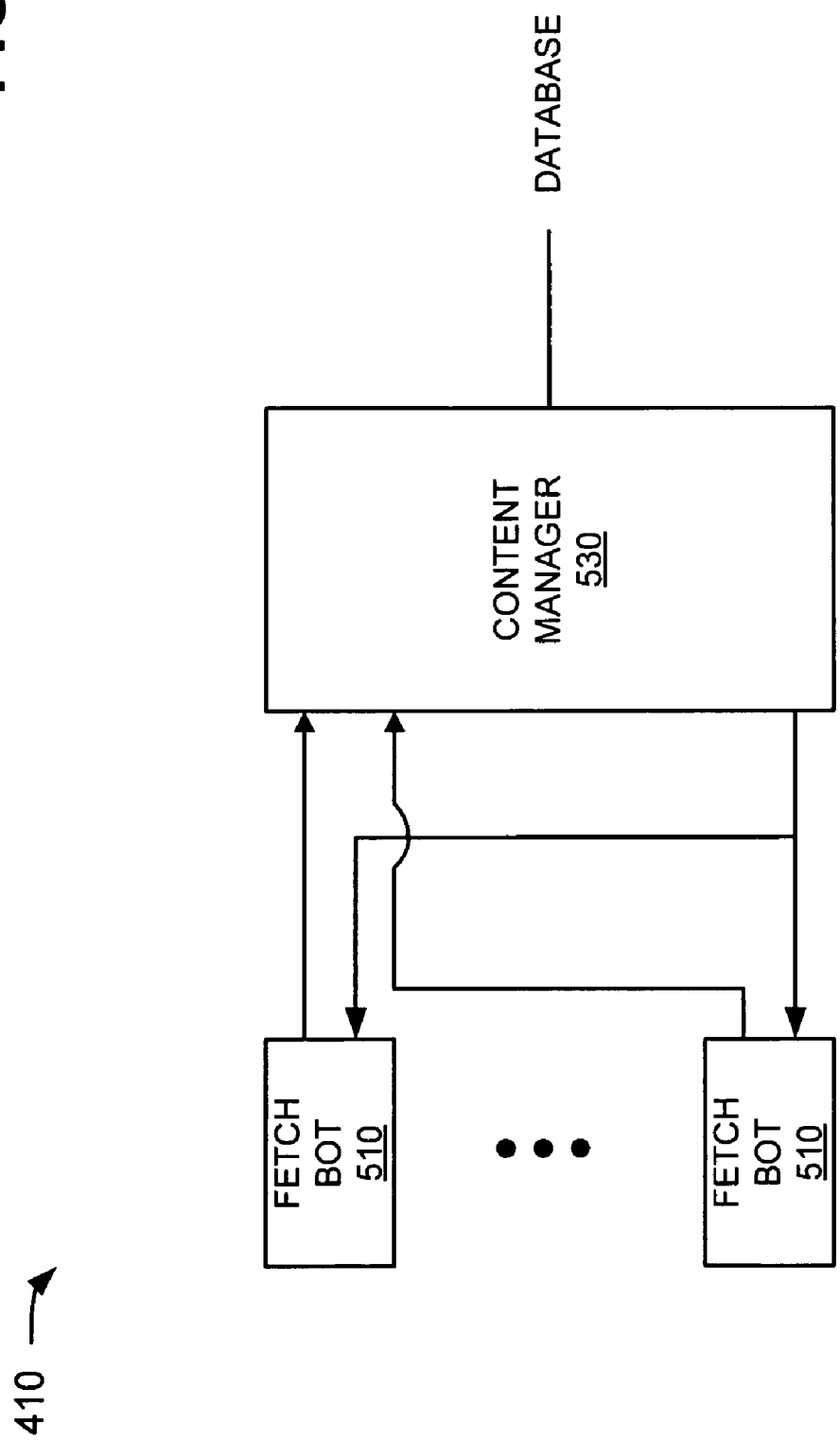
FIG. 5 is a diagram of exemplary functional components of the crawler engine of FIG. 4.

FIG. 5 is a diagram of exemplary functional components of crawler engine 410. In one implementation, crawler engine 410 may be implemented by software and/or hardware within crawler/indexer system 220. In another implementation, crawler engine 410 may be implemented by software and/or hardware within another device or a group of devices separate from or including crawler/indexer system 220.

Crawler engine 410 may include fetch bots 510 and a content manager 530. A fetch bot 510 may fetch a document from a corpus of documents and provide the fetched document to content manager 530. Fetch bots 510 may operate from a list of addresses provided by content manager 530.

Content manager 530 may parse a document fetched by a fetch bot 510 to identify the outgoing links contained in the fetched document. Content manager 530 may add addresses associated with the outgoing links to a list of addresses that it maintains. Content manager 530 may provide addresses from the list to fetch bots 510 as instructions for fetch bots 510 to fetch (i.e., crawl) the corresponding documents. Content manager 530 may also store information associated with the fetched documents (e.g., all or part of the fetched documents) in database 440 (FIG. 4).

Exemplary Bounce Pad Analyzer Functional Components

Figure 6:
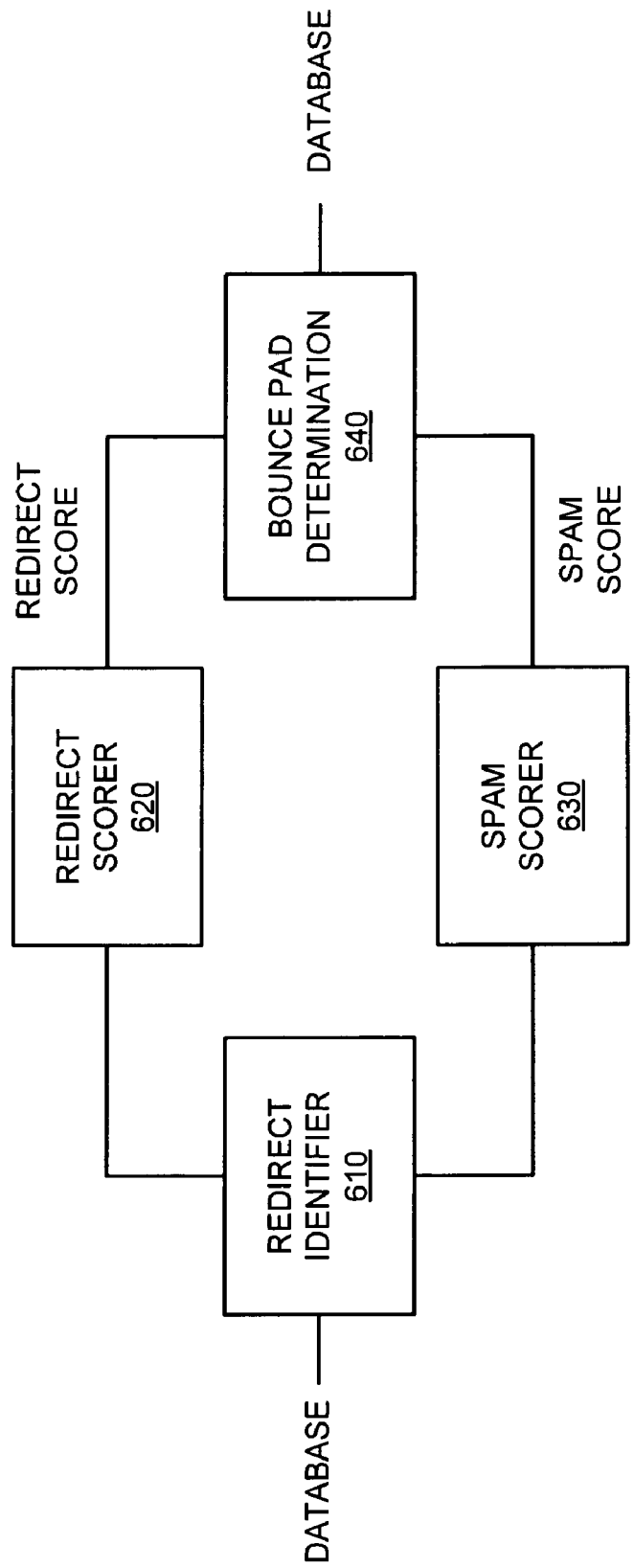
FIG. 6 is a diagram of exemplary functional components of the bounce pad analyzer of FIG. 4.

FIG. 6 is a diagram of exemplary functional components of bounce pad analyzer 420. In one implementation, bounce pad analyzer 420 may be implemented by software and/or hardware within crawler/indexer system 220. In another implementation, bounce pad analyzer 420 may be implemented by software and/or hardware within another device or a group of devices separate from or including crawler/indexer system 220.

Bounce pad analyzer 420 may include a redirect identifier 610, a redirect scorer 620, a spam scorer 630, and a bounce pad determination module 640. Redirect identifier 610 may analyze a set of documents associated with a web site. A typical web site might have millions of associated documents. In one implementation, redirect identifier 610 may analyze information associated with the documents (e.g., addresses, contents, metadata (e.g., refresh meta tags, refresh headers, status codes, etc.) to determine whether the documents are redirects. Redirect identifier 610 may use one of a number of known techniques to identify the redirects. In an alternative implementation, redirect identifier 610 may receive redirect information from another component. In this case, redirect identifier 610 may receive, or look up, a list that identifies which of the documents are redirects.

Redirect scorer 620 may compute a redirect score. For example, redirect scorer 620 may count the number of documents that are redirects and count the number of documents that are not redirects (i.e., that serve content). Redirect scorer 620 may determine the percentage of the documents of the web site that are redirects based on the number of documents that are redirects and the number of documents that are not redirects. If, for example, a web site has 60 documents that are redirects and 40 documents that are not redirects, redirect scorer 620 may determine that 60% of the documents are redirects (i.e., 60 redirects/100 total web site documents). Redirect scorer 620 may generate a redirect score based on this 60%. For example, redirect scorer 620 may generate a redirect score equal to 60, 0.6, or another number derived from the 60%.

Spam scorer 630 may compute a spam score. For example, spam scorer 630 may identify the organizations that are the targets of the redirects. Several techniques exist for identifying an organization that corresponds to an address. For example, a technique might determine that f.com and xyz.abc.f.com are associated with the same organization. Likewise, a technique might determine that abc.com and abc.co.uk are associated with the same organization. Spam scorer 630 may identify how many of the redirects target each of the organizations.

Spam scorer 630 may rank the organizations by the number of times that the organizations are targets of the redirects. Spam scorer 630 may identify a particular number of the top-ranking organizations (e.g., 3) as a "head" and the remaining organizations as a "tail." Spam scorer 630 may then add up the number of redirects to the organizations in the head and separately add up the number of redirects to the organizations in the tail. Spam scorer 630 may compute a ratio of the tail number to the head number.

To illustrate this, assume that a web site "f.com" has documents that redirect to organization A 100 times, organization B 30 times, organization C 20 times, organization D 20 times, and organization E 10 times. Assume that the head includes organizations A, B, and C, and the tail includes organizations D and E. Spam scorer 630 may compute a head number of 150 (i.e., 100+30+20) and compute a tail number of 30 (i.e., 20+10). Spam scorer 630 may determine the tail-to-head ratio of 30/150, or 0.2. Spam scorer 630 may generate a score based on this 0.2. For example, spam scorer 630 may generate a spam score equal to 0.2 or another number derived from the 0.2. In an alternative implementation, spam scorer 630 may generate the spam score based on a head-to-tail ratio instead of the tail-to-head ratio.

Bounce pad determination module 640 may determine whether the web site is a bounce pad based on the redirect score and the spam score. For example, bounce pad determination module 640 may use a function, such as:

$$F(\text{redirect score}, \text{spam score}) = X,$$

where X indicates whether the web site is a bounce pad. The function F may use one of a number of techniques to make a bounce pad determination using the redirect score and the spam score. For example, the function F may compare the redirect score to a redirect threshold and identify the web site as likely being a bounce pad if the redirect score exceeds the redirect threshold. Additionally, or alternatively, the function F may compare the spam score to a spam threshold and identify the web site as likely being a bounce pad if the spam score exceeds the spam threshold. The function F may make the ultimate determination based on both of these comparisons.

Figure 7:
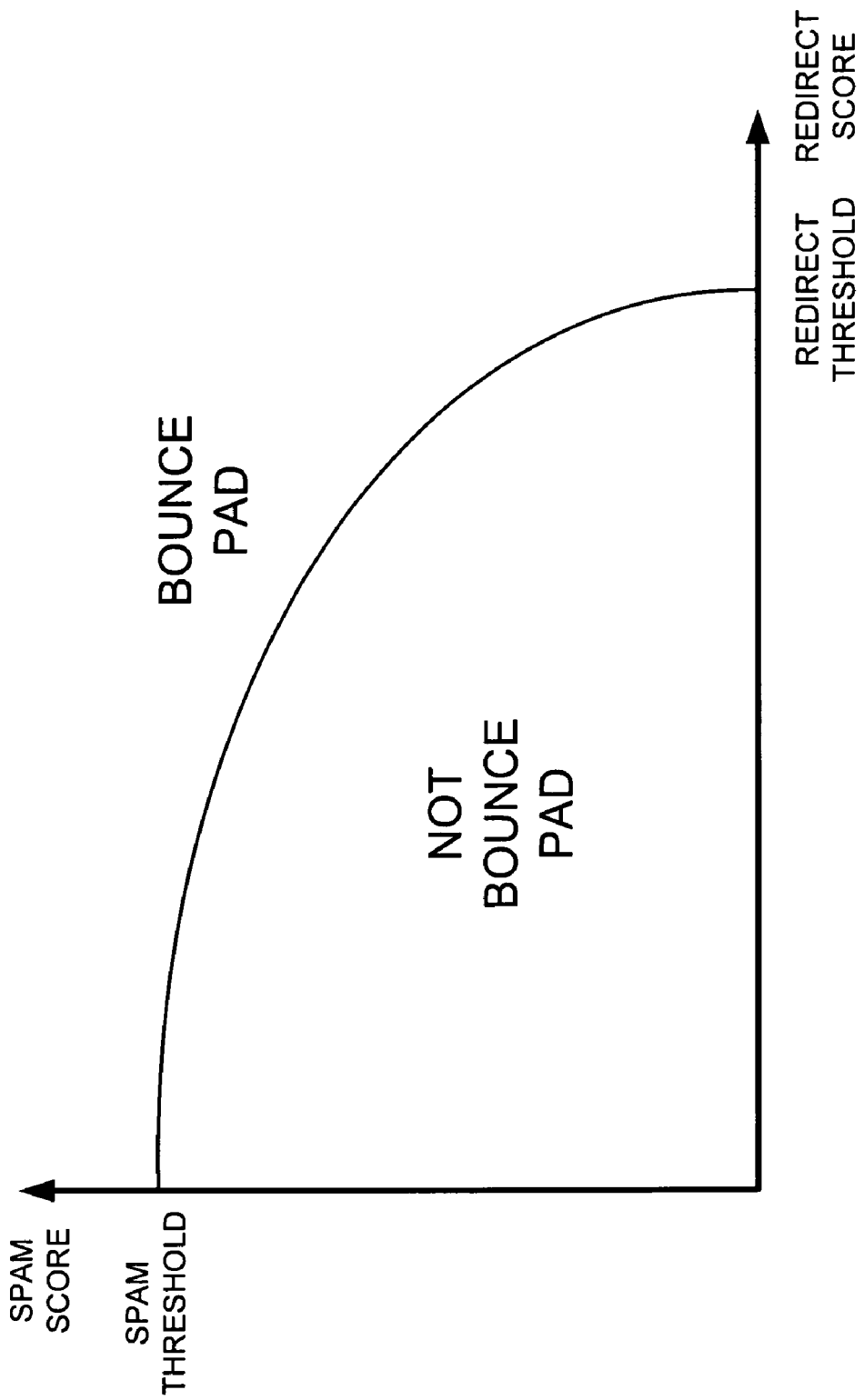
FIG. 7 is a graph showing a possible relationship between a spam score and a redirect score in identification of a bounce pad.

Thus, there may be some relationship between the redirect score and the spam score, such that the higher the redirect score, the lower the spam score required to determine that the web site is a bounce pad, or vice versa. FIG. 7 is a graph showing a possible relationship between a spam score and a redirect score in identifying a bounce pad. As shown in FIG. 7, the higher the spam score, the lower the redirect score that may be required to find that the web site is a bounce pad. Similarly, the higher the redirect score, the lower the spam score that may be required to find that the web site is a bounce pad.

Returning to FIG. 6, bounce pad determination module 640 may make an ultimate decision whether to classify the web site as a bounce pad based on the redirect score and the spam score. In one implementation, it may be beneficial to weight either the redirect score or the spam score more than the other when making the ultimate decision.

Bounce pad determination module 640 may compile a list of bounce pads that it identifies, and may store the list of bounce pads (e.g., in a database, such as database 440). For example, bounce pad determination module 640 may analyze many web sites and add those sites that it has identified as bounce pads to its list.

Exemplary Indexing Engine Functional Components

Figure 8:
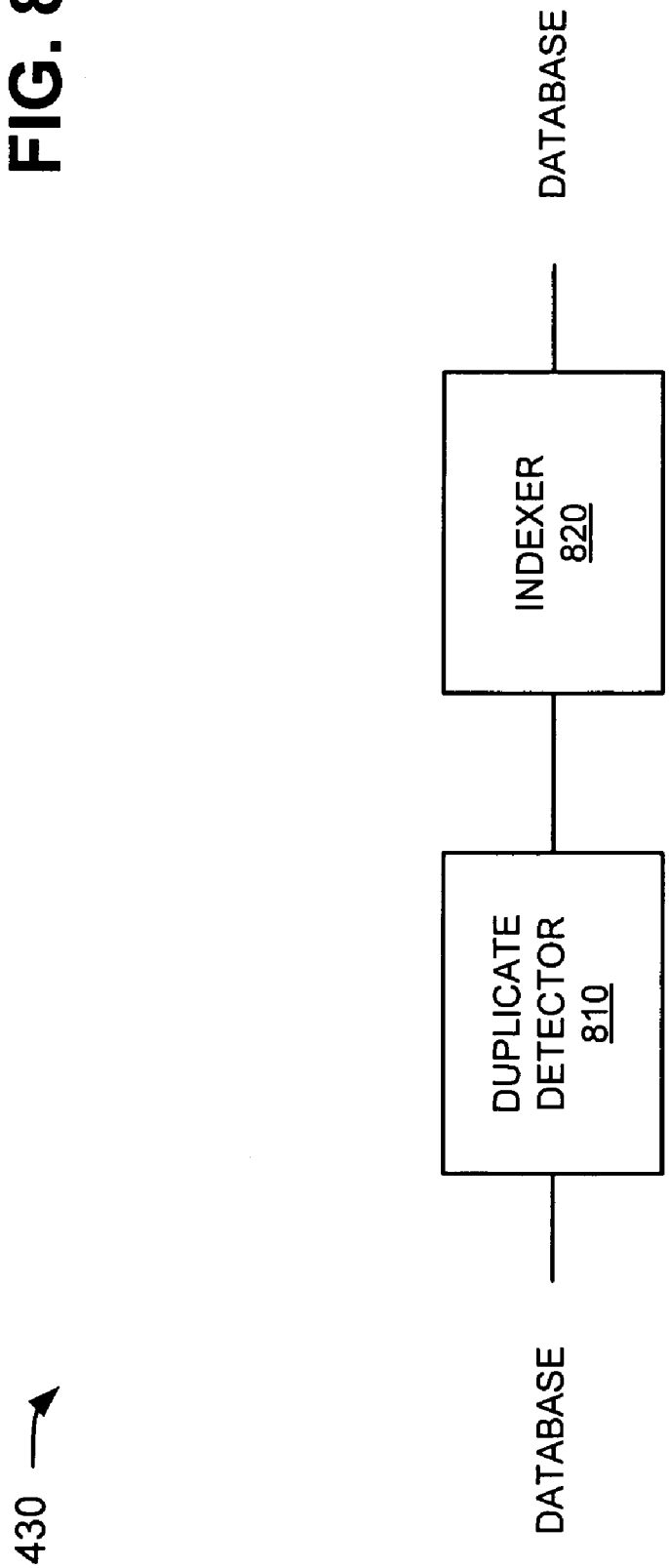
FIG. 8 is a diagram of exemplary functional components of the indexing engine of FIG. 4.

FIG. 8 is a diagram of exemplary functional components of indexing engine 430. In one implementation, indexing engine 430 may be implemented by software and/or hardware within crawler/indexer system 220. In another implementation, indexing engine 430 may be implemented by software and/or hardware within another device or a group of devices separate from or including crawler/indexer system 220.

Indexing engine 430 may include a duplicate detector 810 and an indexer 820. Duplicate detector 810 may place crawled documents into duplicate clusters. Duplicate detector 810 may use one or more of a number of techniques to determine whether two documents are duplicates (including substantial duplicates) of each other. The techniques may generally fall into the categories of content-based clustering and predictive clustering. Content-based clustering may include analyzing the contents of the documents to identify duplicates. Predictive clustering may identify duplicate documents without analyzing the contents of the documents.

An example of a content-based clustering technique may involve duplicate detector 810 computing a checksum or hash over the content, or a portion of the content, of a document. Two documents with the same checksum or hash may be considered duplicates of each other. Another example of a content-based clustering technique may involve analyzing redirects. If a source document redirects to a target document, then the source and target documents may be considered duplicates of each other.

An example of a predictive clustering technique may involve computing checksums or hashes over a web site, a directory or subdirectory, or a combination of address parameters, and generating a set of rules that, given an address, predicts a cluster identifier (ID) for the document associated with that address. A separate set of rules may be generated for each web site, directory, subdirectory, or address parameter combination. Some of these rules may list address prefixes that are equivalents of each other. For example, these rules might specify that www.mysite.com, mysite.com, www.geocities.com/mysite, and geocities.com/mysite are equivalents of each other. Thus, each of these addresses may map to the same cluster ID. Some other rules may identify address parameters that are irrelevant. For example, these rules might specify that given the address www.forum.com/posts, a post identifier (postid) parameter matters, but a session identifier (sid) parameter does not matter. Thus, these rules might identify the addresses www.forum.com/posts/postid=108/sid=162 and www.forum.com/posts/postid=108/sid=867 as equivalents of each other. Thus, each of these addresses may map to the same cluster ID.

Duplicate detector 810 may place each crawled document into a cluster. The cluster may have a single document or thousands or millions of documents. Duplicate detector 810 may rank the documents in a cluster in some manner to create a ranked list. In one implementation, duplicate detector 810 may use information that reflects a quality of the documents to rank the documents within the ranked list. In one implementation, this information may include a measure of quality, such as the document's link-based score.

Duplicate detector 810 may determine whether any of the documents in the ranked list correspond to a bounce pad. For example, duplicate detector 810 may use information from the bounce pad list created by bounce pad analyzer 420 to identify the documents that correspond to a bounce pad. If a document is identified as a bounce pad, duplicate detector 810 may move that document to the bottom of the ranked list. This may ensure that bounce pads do not get indexed or served as search results.

Indexer 820 may index one or more top-ranked documents from each of the ranked lists. For example, indexer 820 may take the text or other data of a top-ranked document in a ranked list, extract individual terms or other data from the text of the document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears. Because indexer 820 indexes only one or more top-ranked documents in a ranked list, indexer 820 may ensure that no bounce pads are indexed and, thus, that no bounce pads are served as search results.

Exemplary Process for Identifying Bounce Pads

Figure 9:
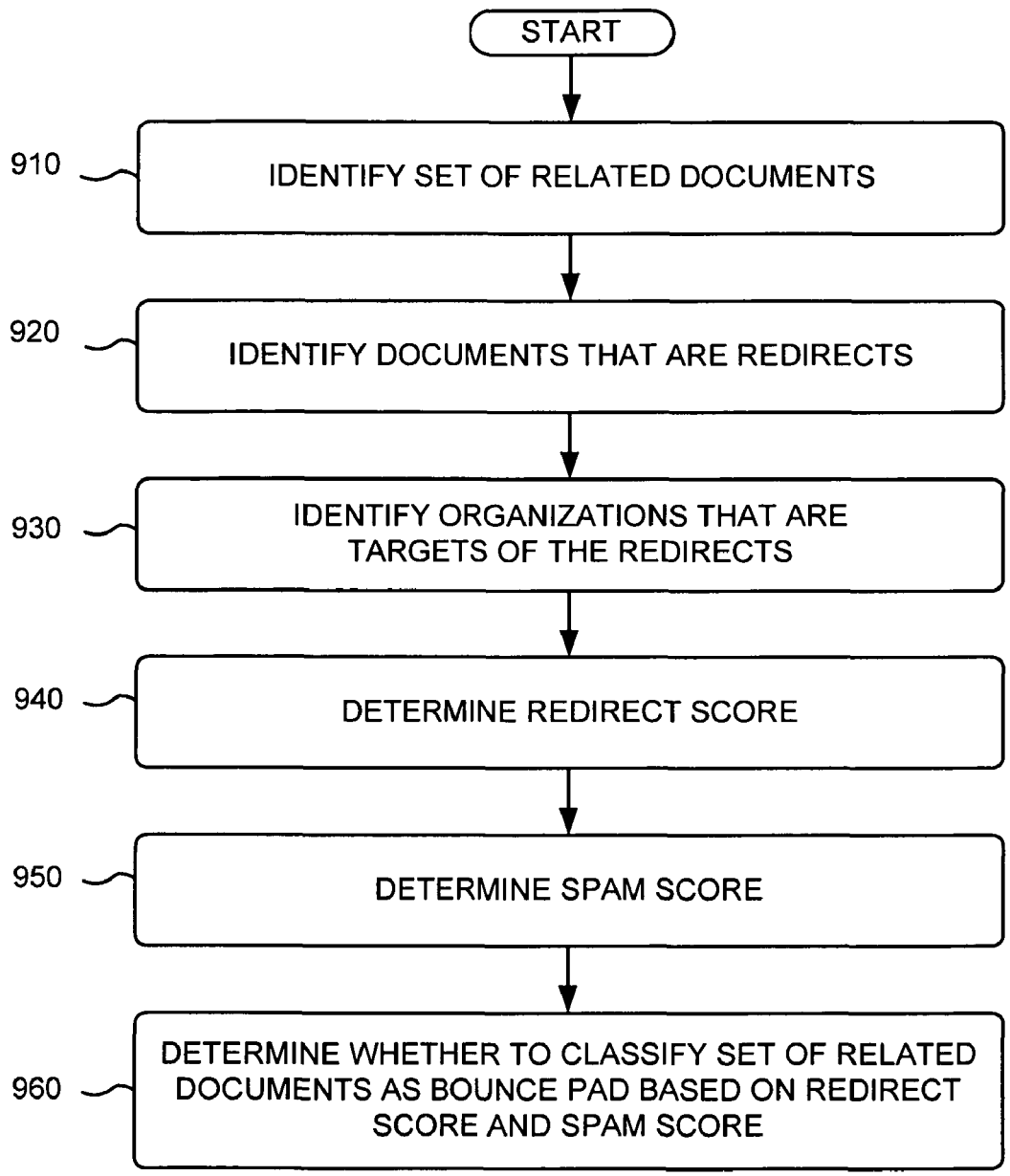
FIG. 9 is a flowchart illustrating an exemplary process for identifying a bounce pad.

FIG. 9 is a flowchart illustrating an exemplary process for identifying a bounce pad. In one implementation, the exemplary process of FIG. 9 may be performed by bounce pad analyzer 420. In another implementation, the exemplary process of FIG. 9 may be performed by one or more other components, possibly in conjunction with bounce pad analyzer 420.

As shown in FIG. 9, the process may begin with a set of related documents being identified (block 910). For example, bounce pad analyzer 420 may identify a set of documents associated with a web site, a directory, a subdirectory, or some other collection of related documents. In one implementation, these documents may include documents that have been crawled by crawler engine 410.

It may be determined which of these documents are redirects (block 920). For example, bounce pad analyzer 420 may analyze information associated with the documents (e.g., addresses, contents, and/or metadata (e.g., refresh meta tags, refresh headers, status codes, etc.)) to determine whether the documents are redirects. Bounce pad analyzer 420 may use one or more of the techniques identified above to identify the redirects. In an alternative implementation, a component separate from bounce pad analyzer 420 may identify the redirects and provide the information to bounce pad analyzer 420.

The organizations that are the targets of the redirects may be identified (block 930). For example, bounce pad analyzer 420 may analyze each of the redirects to identify the organization that is the target of the redirect. Any of a number of known techniques may be used to identify an organization associated with a document.

A redirect score may be determined (block 940). For example, bounce pad analyzer 420 may count the number of documents that are redirects and count the number of documents that serve content and are not redirects. Bounce pad analyzer 420 may determine the percentage of the documents that are redirects based on the number of documents that are redirects and the number of documents that are not redirects. In one implementation, bounce pad analyzer 420 may remove redirects from consideration that are directed to the same organization as the organization associated with the set of related documents being processed.

Figure 10:
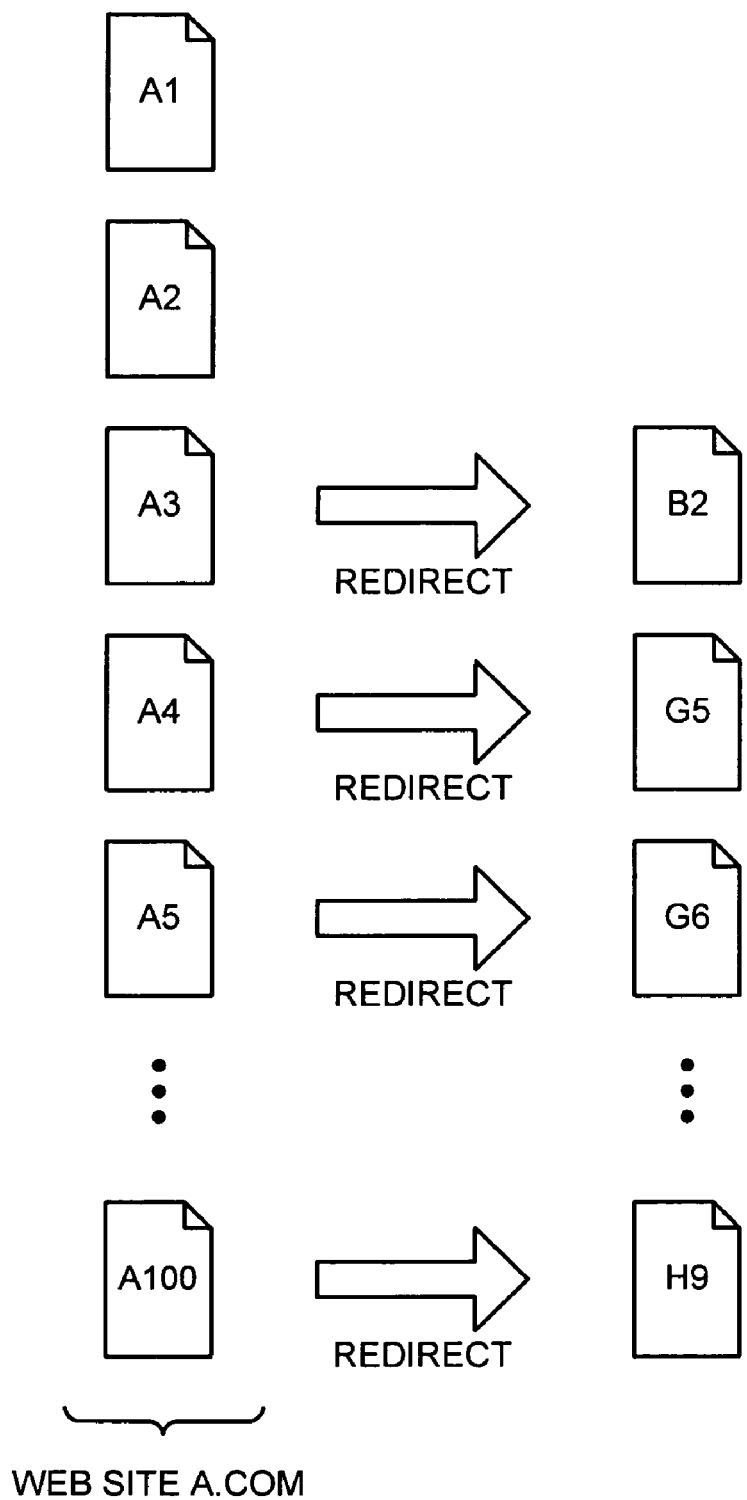
FIG. 10 is a diagram of documents associated with an exemplary web site.

Consider an exemplary web site. FIG. 10 is a diagram of documents associated with the exemplary web site. As shown in FIG. 10, the web site (A.com) has 100 associated documents (A.com/A1, A.com/A2, . . . , A.com/A100). Documents A.com/A1 and A.com/A2 serve content and are not redirects. Various other ones of the documents (e.g., documents A.com/A3, A.com/A4, A.com/A5, and A.com/A100) are redirects. For example, Document A.com/A3 is a source of a redirect to target document B.com/B2; document A.com/A4 is a source of a redirect to target document G.com/G5; document A.com/A5 is a source of a redirect to target document G.com/G6; and document A.com/A100 is a source of a redirect to target document H.com/H9.

Figures 11A, 11B:
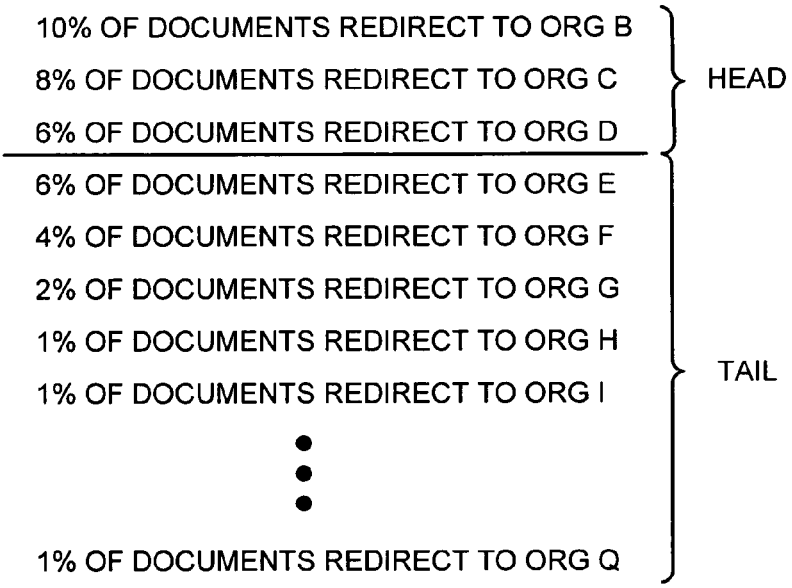
FIG. 11A is a diagram illustrating a process for calculating a redirect score.
FIG. 11B is a diagram illustrating a process for calculating a spam score.

Assume that 40% of the documents of web site A.com are not redirects and 60% of the documents of web site A.com are redirects, as shown in FIG. 11A. Bounce pad analyzer 420 may generate a redirect score based on the 60% of the documents that are redirects. For example, bounce pad analyzer 420 may generate a redirect score equal to 60, 0.6, or another number derived from the 60%.

Returning to FIG. 9, a spam score may be determined (block 950). For example, bounce pad analyzer 420 may identify how many of the redirects target each of the organizations that were previously identified. Assume that web site A.com redirects to 70 different organizations, as shown in FIG. 11B. For example, assume that 10% of the documents redirect to organization B, 8% of the documents redirect to organization C, 6% of the documents redirect to organization D, 6% of the documents redirect to organization E, 4% of the documents redirect to organization F, 2% of the documents redirect to organization G, and 1% of the documents redirect to each of organizations H through Q, as further shown in FIG. 11B.

Bounce pad analyzer 420 may rank the organizations by the number of times that the organizations are targets of the redirects. Bounce pad analyzer 420 may identify a particular number of the top-ranking organizations (e.g., 3) as the "head" and the remaining organizations as the "tail." In one implementation, bounce pad analyzer 420 may remove redirects from consideration that are directed to the same organization as the organization associated with the set of related documents being processed.

Bounce pad analyzer 420 may then add up the number of redirects to the organizations in the head and separately add up the number of redirects to the organizations in the tail. As shown in FIG. 11B, the head may total 24% and the tail may total 76%. Bounce pad analyzer 420 may compute a ratio of the tail number to the head number, as the spam score. As shown in FIG. 11B, the spam score may be equal to, or derived from, 76/24.

Returning to FIG. 9, it may be determined whether to classify the set of related documents as a bounce pad based on the redirect score and the spam score (block 960). For example, as explained above, bounce pad analyzer 420 may use a function F that considers both the redirect score and the spam score to make a determination of whether the related documents are associated with a bounce pad. If bounce pad analyzer 420 classifies the set of related documents as a bounce pad, bounce pad analyzer 420 may add information regarding the set of related documents to a list of bounce pads that it maintains. For web site A.com, for example, bounce pad analyzer 420 may add an identifier associated with web site A.com, such as "A.com" (meaning that any address that contains "A.com" is a bounce pad), to the list of bounce pads.

Exemplary Process for Selecting Duplicate Document to Index

Figure 12:
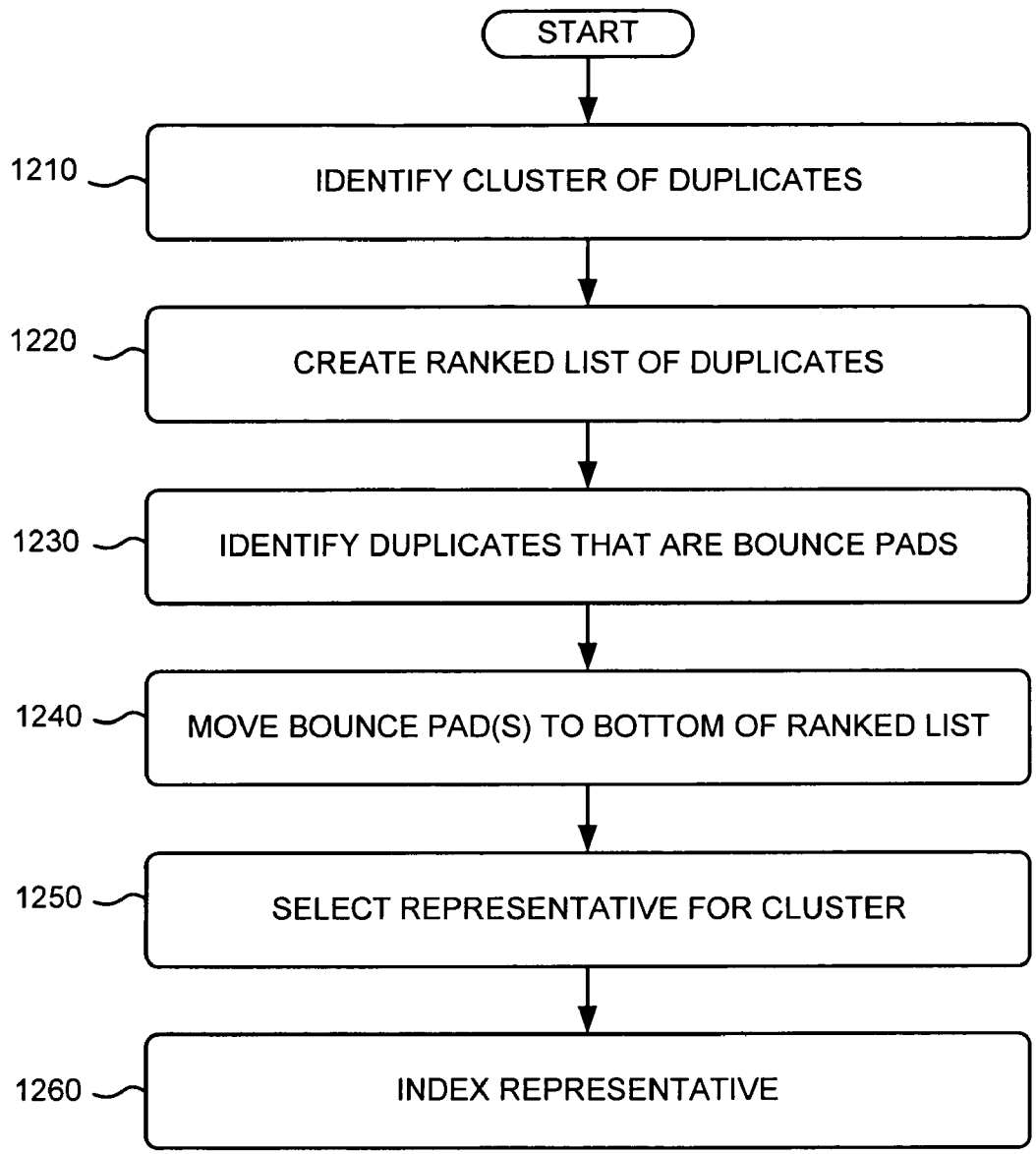
FIG. 12 is a flowchart illustrating an exemplary process for selecting a duplicate document to index.

FIG. 12 is a flowchart illustrating an exemplary process for selecting a duplicate document to index. In one implementation, the exemplary process of FIG. 12 may be performed by indexing engine 430. In another implementation, the exemplary process of FIG. 12 may be performed by one or more other components, possibly in conjunction with indexing engine 430.

As shown in FIG. 12, the process may begin with a cluster of duplicates being identified (block 1210). As explained above, indexing engine 430 may use one or more of a number of techniques to cluster sets of duplicate documents. Indexing engine 430 may select one of these clusters upon which to operate.

A ranked list of duplicates in the cluster may be created (block 1220). For example, as explained above, indexing engine 430 may rank the documents in the cluster in some manner to create a ranked list. In one implementation, indexing engine 430 may use information regarding the quality of a document (e.g., a measure of quality, such as a link-based score) to rank the document within the ranked list.

Duplicates that are bounce pads may be identified (block 1230). For example, indexing engine 430 may determine whether any of the documents in the ranked list correspond to a bounce pad. In one implementation, indexing engine 430 may use information from the bounce pad list created by bounce pad analyzer 420 to identify the documents that correspond to a bounce pad.

Figure 13A:
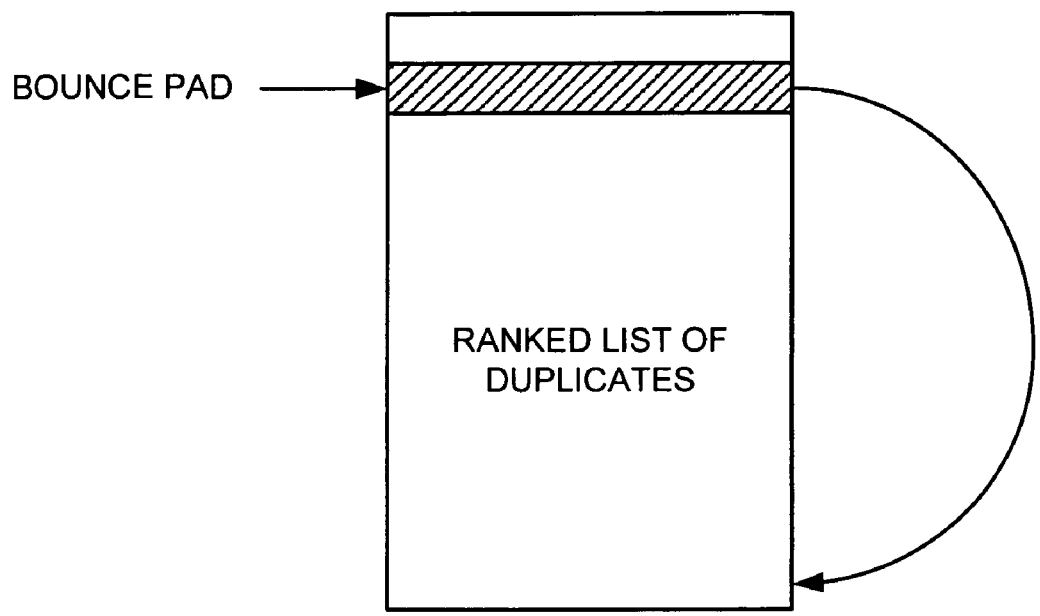
FIGS. 13A and 13B are diagrams illustrating how a bounce pad is processed when selecting a duplicate document to index.
Figure 13B:
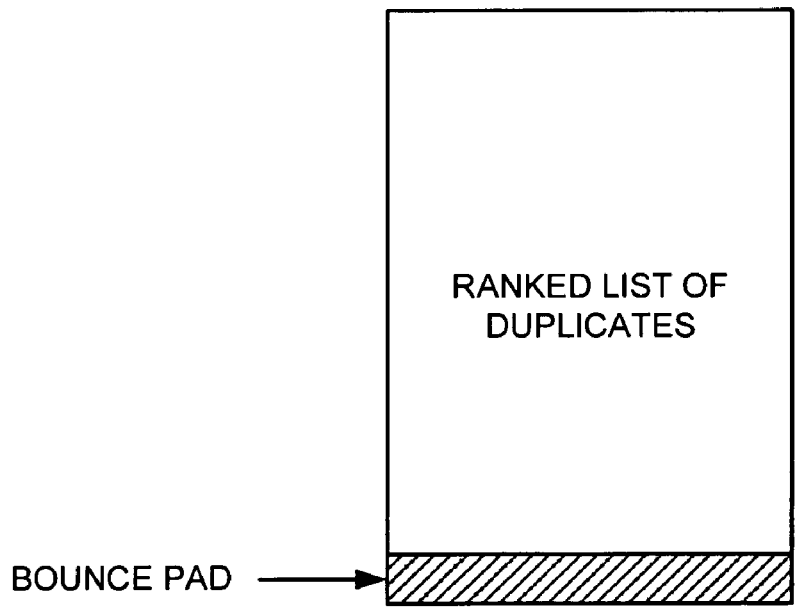

The identified bounce pad(s) may be moved to the bottom of the ranked list (block 1240). As shown in FIGS. 13A and 13B, for example, indexing engine 430 may move an identified bounce pad to the bottom of a ranked list of duplicates. The bounce pad need not, however, be the absolute bottom of the ranked list. Instead, the bounce pad may be moved a number of positions toward the bottom of the ranked list or have its measure of quality, which may be used to rank the bounce pad, reduced by a particular number or fraction.

Returning to FIG. 12, a representative for the cluster may be selected (block 1250). For example, indexing engine 430 may select one duplicate, or a set of duplicates, as the representative (sometimes called the "canonical") for the cluster. In one implementation, indexing engine 430 may select the highest ranking duplicate in the ranked list as the representative for the cluster.

The representative may be indexed (block 1260). For example, indexing engine 430 may take the text or other data of the representative document, extract individual terms or other data from the text of the representative document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears. Because indexing engine 430 does not index bounce pads, indexing engine 430 may ensure that no bounce pads are served as search results.

CONCLUSION

Implementations described herein may identify bounce pads and ensure that these bounce pads are not indexed and, thus, not served to users as search results.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9 and 12, the order of the blocks may be modified in other implementations. Further, non-dependent blocks may be performed in parallel.

As used herein, the term "component," is intended to be broadly interpreted to refer to hardware, software, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more computer devices, the method comprising:
    identifying a set of related documents;
    identifying one or more documents, in the set of related documents, that are sources of redirects;
    identifying organizations that are targets of the redirects;
    determining a redirect score based on a number of the identified documents that are sources of the redirects;
    determining a spam score based on a number of the organizations that are targets of the redirects;
    determining whether to classify the set of related documents as a bounce pad based on the redirect score and the spam score; and
    storing information associated with a result of the determination of whether to classify the set of related documents as a bounce pad.

2. The method of claim 1, where identifying the set of related documents includes:
    identifying documents associated with a same web site, a same directory, a same subdirectory, a same host, a same domain, or a same organization as the set of related documents.

3. The method of claim 1, where identifying the one or more documents, in the set of related documents, that are sources of the redirects includes:
    analyzing information associated with a document, in the set of related documents, to determine whether the document is a source of a redirect, where the analyzed information includes an address of the document, a content of the document, or metadata associated with the document.

4. The method of claim 1, where determining the redirect score includes:
    counting a first number of the identified documents that are sources of the redirects,
    counting a second number of the documents in the set of related documents that are not sources of the redirects,
    determining a percentage of documents in the set of related documents that are sources of the redirects based on the first number and the second number, and
    computing the redirect score based on the determined percentage.

5. The method of claim 1, where determining the spam score includes:
    counting a number of times each of the organizations is a target of one of the redirects,
    creating a ranked list that ranks each of the organizations based on the number of times that the organization is a target of one of the redirects, and
    computing the spam score based on the ranked list.

6. The method of claim 5, where computing the spam score includes:
    identifying a first set of the organizations in the ranked list as a head,
    identifying a second set of the organizations in the ranked list as a tail,
    adding the number of times each of the organizations, in the head, is a target of one of the redirects to generate a head number,
    adding the number of times each of the organizations, in the tail, is a target of one of the redirects to generate a tail number, and
    generating the spam score based on a ratio of the tail number to the head number, or based on a ratio of the head number to the tail number.

7. The method of claim 1, where storing the information associated with the result of the determination includes:
    adding the information to a list of bounce pads when the set of related documents is classified as a bounce pad.

8. The method of claim 7, further comprising:
    identifying a cluster of duplicate documents;
    determining whether a particular document in the cluster of duplicate documents corresponds to a bounce pad in the list of bounce pads;
    selecting one of the documents, in the cluster of duplicate documents, as representative of the cluster without considering the particular document when the particular document corresponds to a bounce pad in the list of bounce pads; and
    indexing the selected document.

9. The method of claim 8, where selecting one of the documents, in the cluster of duplicate documents, as representative of the cluster includes:
    creating a ranked list of the documents in the cluster of duplicate documents, and
    moving the particular document toward a bottom of the ranked list when the particular document corresponds to a bounce pad in the list of bounce pads.

10. A system, comprising:
    a memory to store a list of bounce pads; and
    a processor, connected to the memory, to:
    identify a set of related documents,
    identify documents, in the set of related documents, that are sources of redirects,
    identify organizations that are targets of the redirects,
    determine a redirect score based on a number of the identified documents that are sources of the redirects,
    determine a spam score based on a number of the organizations that are targets of the redirects,
    selectively classify the set of related documents as a bounce pad based on the redirect score and the spam score, and
    add information associated with the set of related documents to the list of bounce pads when the set of related documents is classified as a bounce pad.

11. The system of claim 10, where the set of related documents includes documents associated with a same web site, a same directory, a same subdirectory, a same host, a same domain, or a same organization.

12. The system of claim 10, where when identifying the documents, in the set of related documents, that are sources of the redirects, the processor is configured to analyze information associated with a document in the set of related documents to determine whether the document is a source of a redirect, where the analyzed information includes an address of the document, a content of the document, or metadata associated with the document.

13. The system of claim 10, where when determining the redirect score, the processor is configured to:
  count a first number of the identified documents that are sources of the redirects,
  count a second number of the documents, in the set of related documents, that are not sources of the redirects,
  determine a percentage of documents, in the set of related documents, that are sources of the redirects based on the first number and the second number, and
  compute the redirect score based on the determined percentage.

14. The system of claim 10, where when determining the spam score, the processor is configured to:
  count a number of times each of the organizations is a target of one of the redirects,
  create a ranked list that ranks each of the organizations based on the number of times that the organization is a target of one of the redirects, and
  compute the spam score based on the ranked list.

15. The system of claim 14, where when computing the spam score, the processor is configured to:
  identify a first set of the organizations in the ranked list as a head,
  identify a second set of the organizations in the ranked list as a tail,
  add the number of times each of the organizations, in the head, is a target of one of the redirects to generate a head number,
  add the number of times each of the organizations, in the tail, is a target of one of the redirects to generate a tail number, and
  generate the spam score based on a ratio of the tail number to the head number, or based on a ratio of the head number to the tail number.

16. The system of claim 10, where the processor is further configured to:
  identify a cluster of duplicate documents,
  determine whether a particular document, in the cluster of duplicate documents, corresponds to a bounce pad in the list of bounce pads,
  select one of the documents, in the cluster of duplicate documents, as representative of the cluster without considering the particular document when the particular document corresponds to a bounce pad in the list of bounce pads, and
  index the selected document.

17. The system of claim 16, where when selecting one of the documents in the cluster of duplicate documents as representative of the cluster, the processor is configured to:
  create a ranked list of the documents in the cluster of duplicate documents, and
  move the particular document toward a bottom of the ranked list when the particular document corresponds to a bounce pad in the list of bounce pads.

18. A non-transitory computer-readable memory device storing instructions executable by one or more processors, the computer-readable memory device comprising:
  one or more instructions to identify a set of related documents;
  one or more instructions to identify one or more documents, in the set of related documents, that are sources of redirects;
  one or more instructions to identify organizations that are targets of the redirects;
  one or more instructions to determine a redirect score based on a number of the identified documents that are sources of the redirects;
  one or more instructions to determine a spam score based on a number of the organizations that are targets of the redirects;
  one or more instructions to determine whether to classify the set of related documents as a bounce pad based on the redirect score and the spam score; and
  one or more instructions to store information associated with a result of the determination of whether to classify the set of related documents as a bounce pad.

19. The computer-readable memory device of claim 18, where the one or more instructions to determine the redirect score include:
  one or more instructions to count a first number of the identified documents that are sources of the redirects,
  one or more instructions to count a second number of the documents in the set of related documents that are not sources of the redirects,
  one or more instructions to determine a percentage of documents in the set of related documents that are sources of the redirects based on the first number and the second number, and
  one or more instructions to compute the redirect score based on the determined percentage.

20. The computer-readable memory device of claim 18, where the one or more instructions to determine the spam score include:
  one or more instructions to count a number of times each of the organizations is a target of one of the redirects,
  one or more instructions to create a ranked list that ranks each of the organizations based on the number of times that the organization is a target of one of the redirects, and
  one or more instructions to compute the spam score based on the ranked list.

21. The computer-readable memory device of claim 20, where the one or more instructions to compute the spam score include:
  one or more instructions to identify a first set of the organizations in the ranked list as a head,
  one or more instructions to identify a second set of the organizations in the ranked list as a tail,
  one or more instructions to add the number of times each of the organizations, in the head, is a target of one of the redirects to generate a head number,
  one or more instructions to add the number of times each of the organizations, in the tail, is a target of one of the redirects to generate a tail number, and
  one or more instructions to generate the spam score based on a ratio of the tail number to the head number, or based on a ratio of the head number to the tail number.

22. The computer-readable memory device of claim 18, where the one or more instructions to store the information associated with the result of the determination include:
  one or more instructions to add the information to a list of bounce pads when the set of related documents is classified as a bounce pad; and
  where the computer-readable memory device further comprises:
    one or more instructions to identify a cluster of duplicate documents;
    one or more instructions to determine whether a particular document, in the cluster of duplicate documents, corresponds to a bounce pad in the list of bounce pads;
    one or more instructions to select one of the documents, in the cluster of duplicate documents, as representative of the cluster without considering the particular document when the particular document corresponds to a bounce pad in the list of bounce pads; and
    one or more instructions to index the selected document.

* * * * *